(12) United States Patent  
Arzelier et al.

(10) Patent No.: US 11,146,408 B2  
(45) Date of Patent: Oct. 12, 2021

(54) DETECTING MISBEHAVIOR OF INTELLIGENT TRANSPORT STATIONS

(71) Applicant: BlackBerry Limited, Waterloo (CA)

(72) Inventors: Claude Jean-Frederic Arzelier, Molieres-sur-Ceze (FR); Stephen John Barrett, Haywards Heath (GB); Eswar Vutukuri, Havant (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/613,914

(22) PCT Filed: May 18, 2017

(86) PCT No.: PCT/IB2017/000817  
§ 371 (c)(1),  
(2) Date: Nov. 15, 2019

(87) PCT Pub. No.: WO2018/211303  
PCT Pub. Date: Nov. 22, 2018

(65) Prior Publication Data  
US 2021/0067967 A1   Mar. 4, 2021

(51) Int. Cl.  
*H04W 4/02* (2018.01)  
*H04L 9/32* (2006.01)  
(Continued)

(52) U.S. Cl.  
CPC ........ *H04L 9/3268* (2013.01); *H04L 63/0823* (2013.01); *H04W 4/40* (2018.02); *H04W 12/069* (2021.01); *H04W 12/082* (2021.01)

(58) Field of Classification Search  
CPC .............. H04L 9/3268; H04L 63/0823; H04M 2242/30; H04W 4/02–029;  
(Continued)

(56) References Cited

U.S. PATENT DOCUMENTS 8,452,956 B1 *  5/2013  Kersey .................... H04L 63/10  
                                                     713/153  
8,549,284 B1   10/2013  Kherani  
(Continued)

FOREIGN PATENT DOCUMENTS

CN          101099407 A       1/2008  
CN          103383820 A       11/2013  
(Continued)

OTHER PUBLICATIONS

3GPP TS 23.032 V14.0.0 Technical Specification 3rd Generation Partnership Project; Technical Specification Group Services and System Aspects; Universal Geographical Area Description (GAD) (Release 14) (Mar. 2017) (29 pages).

(Continued)

*Primary Examiner* — Ronald Eisner  
(74) *Attorney, Agent, or Firm* — Trop Pruner & Hu, P.C.

(57) ABSTRACT

In some examples, a system receives first information corresponding to an intelligent transport system (ITS) station, and detects, based on the first information corresponding to the ITS station and based on second information provided by a cellular network relating to the ITS station, misbehavior of the ITS station, the second information includes location information acquired by the cellular network.

23 Claims, 9 Drawing Sheets

(51) Int. Cl.
  *H04W 12/069* (2021.01)
  *H04W 4/40* (2018.01)
  *H04W 12/082* (2021.01)
  *H04L 29/06* (2006.01)
(58) Field of Classification Search
  CPC .......... H04W 4/40–48; H04W 12/069; H04W 12/082; H04W 12/63; H04W 48/04
  See application file for complete search history.

(56) References Cited

U.S. PATENT DOCUMENTS

| | | | |
|---|---|---|---|
| 2003/0129952 A1* | 7/2003 | Inoue | H04B 1/28 455/95 |
| 2012/0005742 A1* | 1/2012 | Chen | H04L 63/0884 726/12 |
| 2012/0196599 A1* | 8/2012 | Cho | H04W 12/086 455/435.1 |
| 2012/0208552 A1* | 8/2012 | Siomina | H04W 64/003 455/456.1 |
| 2015/0270975 A1* | 9/2015 | Buckley | H04W 12/06 713/156 |
| 2015/0327208 A1* | 11/2015 | Qiu | H04W 12/104 455/456.1 |
| 2016/0140842 A1* | 5/2016 | Park | G08G 1/052 340/905 |
| 2020/0304958 A1* | 9/2020 | Xu | H04W 4/06 |

FOREIGN PATENT DOCUMENTS

| | | | |
|---|---|---|---|
| CN | 104869638 A | | 8/2015 |
| CN | 105339809 A | | 2/2016 |
| CN | 105657659 A | | 6/2016 |
| CN | 106161337 A | | 11/2016 |
| WO | WO 2017/171784 | * | 10/2017 ............ H04W 4/06 |

OTHER PUBLICATIONS

3GPP TS 23.271 V14.1.0 Technical Specification 3rd Generation Partnership Project; Technical Specification Group Services and System Aspects; Functional stage 2 description of Location Services (LCS) (Release 14) (Mar. 2017) (185 pages).
3GPP TS 23.285 V14.2.0 Technical Specification 3rd Generation Partnership Project; Technical Specification Group Services and System Aspects; Architecture enhancements for V2X services (Release 14) (Mar. 2017) (35 pages).
3GPP TS 23.303 V14.1.0 Technical Specification 3rd Generation Partnership Project; Technical Specification Group Services and System Aspects; Proximity-based services (ProSe); Stage 2 (Release 14) (Dec. 2016) (125 pages).
3GPP TS 23.682 V15.0.0 (Mar. 2017) Technical Specification 3rd Generation Partnership Project; Technical Specification Group Services and System Aspects; Architecture enhancements to facilitate communications with packet data networks and applications (Release 15) (Mar. 2017) (110 pages).
3GPP TS 25.305 V14.0.0 Technical Specification 3rd Generation Partnership Project; Technical Specification Group Radio Access Network; Stage 2 functional specification of User Equipment (UE) positioning in UTRAN (Release 14) (Mar. 2017) (95 pages).
3GPP TS 29.061 V14.3.0 Technical Specification 3rd Generation Partnership Project; Technical Specification Group Core Network and Terminals; Interworking between the Public Land Mobile Network (PLMN) supporting packet based services and Packet Data Networks (PDN) (Release 14) (Mar. 2017) (173 pages).
3GPP TS 36.305 V14.1.0 Technical Specification 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14) (Mar. 2017) (77 pages).
3GPP TS 36.331 V14.2.2 Technical Specification 3rd Generation Partnership Project; Technical Specification Group Radio Access Network; Evolved Universal Terrestrial Radio Access (E-UTRA); Radio Resource Control (RRC); Protocol specification (Release 14) (Apr. 2017) (722 pages).
3GPP TS 43.059 V14.0.0 Technical Specification 3rd Generation Partnership Project; Technical Specification Group Radio Access Network; Functional stage 2 description of Location Services (LCS) in GERAN(Release 14) (Mar. 2017) (82 pages).
Bibmeyer, Misbehavior Detection and Attacker Identification in Vehicular Ad hoc Networks, Nov. 27, 2014 (211 pages).
Cadzow, ITS—Safety, Security and Privacy, 2015 (93 pages).
Final draft ETSI EN 302 637-2 V1.3.1 Intelligent Transport Systems (ITS); Vehicular Communications; Basic Set of Applications; Part 2: Specification of Cooperative Awareness Basic Service (Sep. 2014) (44 pages).
Final draft ETSI EN 302 637-3 V1.2.1 Intelligent Transport Systems (ITS); Vehicular Communications; Basic Set of Applications; Part 3: Specifications of Decentralized Environmental Notification Basic Service (Sep. 2014) (73 pages).
ETSI TS 102 940 V1.2.1 Intelligent Transport Systems (ITS); Security; ITS communications security architecture and security management (Nov. 2016) (38 pages).
ETSI TS 102 941 V1.1.1 Intelligent Transport Systems (ITS); Security; Trust and Privacy Management (Jun. 2012) (30 pages).
ETSI TS 103 097 V1.2.1 Intelligent Transport Systems (ITS); Security; Security header and certificate formats (Jun. 2015) (35 pages).
Hubaux, The Security and Privacy of Smart Vehicles, IEEE 2004 (7 pages).
Tisa, Safety related message sets—Selection of DATEX II Codes, TPEG2-TEC-Causes and TMCEvents for EC high level Categories, 2013 (17 pages).
Whyte, A Security credential management system for V2V communications, 2013 (9 pages).
European Patent Office, International Search Report for PCT/IB2017/000817 dated Jan. 29, 2019 (4 pages).
European Patent Office, Written Opinion of International Searching Authority for PCT/IB2017/000817 dated Jan. 29, 2019 (4 pages).
3GPP Draft; 5G White Paper, "5G Automotive Vision," (downloaded on Dec. 7, 2015) XP051053269, Nov. 30, 2015 (68 pages).

* cited by examiner

DETECTING MISBEHAVIOR OF INTELLIGENT TRANSPORT STATIONS

BACKGROUND

Vehicles can be provided with communication components to allow the vehicles to communicate with each other, with a network or other service infrastructure, or with another device. Examples of information that can be transmitted or received by vehicles can include data collected by sensors, traffic information, status information, and so forth. Under certain scenarios, information transmitted by vehicles can be inaccurate, incorrect, or misleading.

BRIEF DESCRIPTION OF THE DRAWINGS

Some implementations of the present disclosure are described with respect to the following figures.

Figure 1:
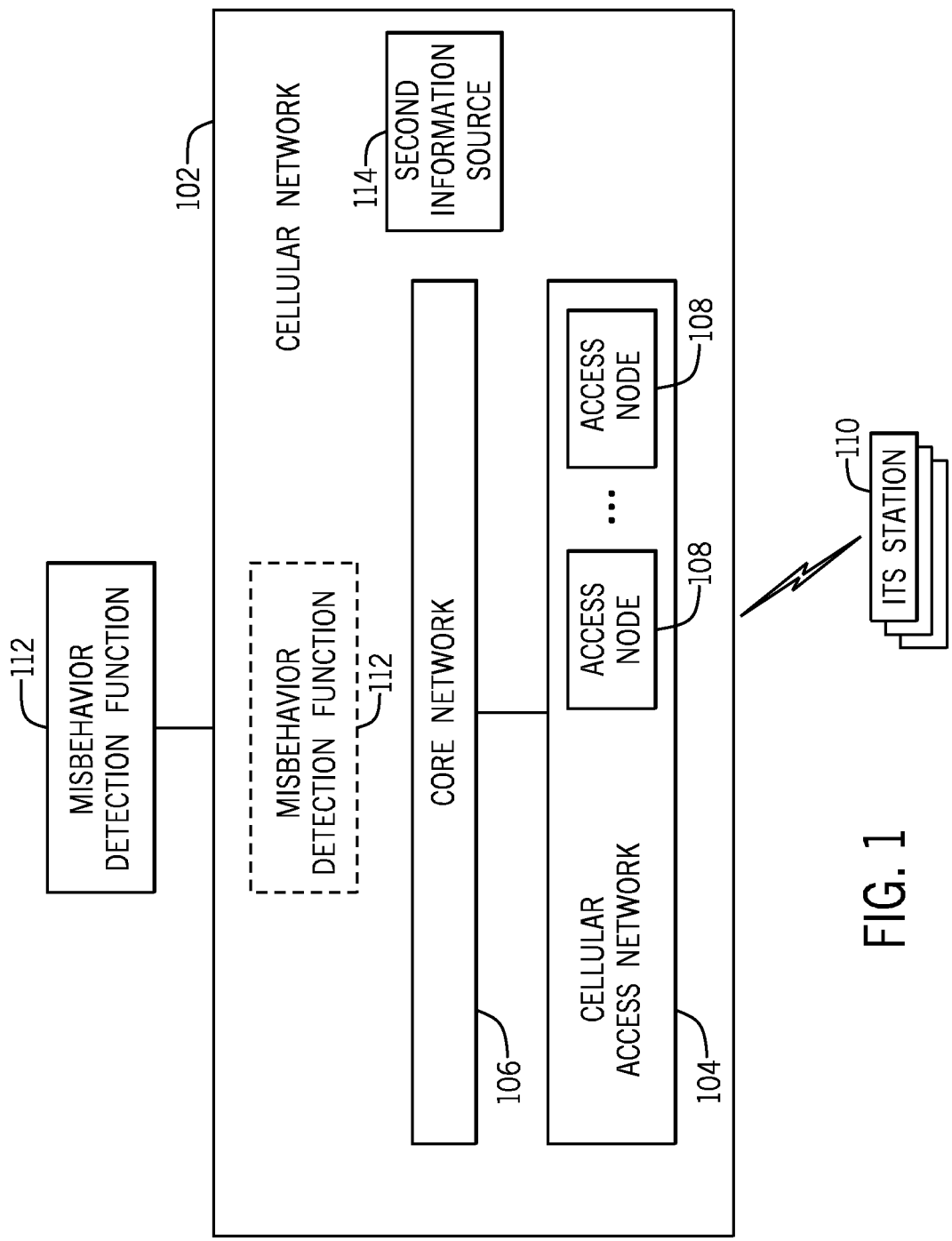
FIG. 1 is a block diagram of an example arrangement that includes an intelligent transport systems (ITS) station, a wireless (e.g. cellular) network, and other nodes according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the ensuing discussion, a vehicle can refer to any platform that is moveable and that can carry cargo and/or people, such as a truck, a trailer, a tractor, a car, a railed vehicle (e.g., a train), a watercraft (e.g., a ship), an aircraft, a spacecraft, and so forth.

Vehicle-to-Everything (V2X) can refer to a set of services that allows vehicles on the road to communicate with pedestrians, other vehicles or infrastructure to receive or transmit information used for various purposes, such as to allow vehicles or road users to safely traverse a road system. An example of an architecture for V2X is described in the Third Generation Partnership Project (3GPP) Technical Specification (TS) 23.285, Rel-14, "Architecture Enhancements for V2X Services."

V2X communications can include vehicle Vehicle-to-Vehicle (V2V) communications (communications between vehicles), Vehicle-to-Infrastructure (V2I) communications (communications between vehicles and equipment of an infrastructure), Vehicle-to-Network (V2N) communications (communications between vehicles and nodes of a network, such as a cellular network), and Vehicle-to-Pedestrian (V2P) communications (communications between vehicles and devices worn on or carried by users). Devices worn on or carried by users can include smartphones, tablet computers, notebook computers, wearable devices (e.g., smart watches, smart eyeglasses, head-mounted electronic devices, etc.), sensor devices, and so forth.

An Intelligent Transport Systems (ITS) station can refer to any device that is capable of performing V2X communications. An ITS station can be carried by, fitted to, or mounted on a vehicle, a pedestrian, a cyclist, an animal, or a fixed node at a particular location. An example of an ITS station that is fixed in location is a road side unit (RSU), which refers to any equipment that is provided on a road, on the side of a road, or in proximity to a road. For example, an RSU can be part of a traffic light, an electronic sign, a toll booth, or any other type of structure.

Examples of information that can be communicated to or from ITS stations include information pertaining to a road congestion/traffic condition, information relating to an accident or collision, information relating to wrong way driving, information relating to a slow vehicle, information relating to a stationary vehicle, and information relating to a dangerous situation. Examples of information relating to a traffic condition can include information relating to a traffic jam (such as whether the traffic jam is increasing or decreasing in intensity, whether traffic is stationary, etc.). Information relating to wrong way driving can refer to information indicating whether a vehicle is driving in a wrong lane or is driving in the wrong direction. Information relating to a stationary vehicle can include information relating to whether there is a problem with a human (e.g. a driver of vehicle is unconscious), whether a vehicle has broken down, whether a crash or collision has occurred, whether a vehicle is a public transport vehicle that has stopped, whether a vehicle is carrying dangerous cargo, and so forth.

Information relating to a dangerous situation can include information indicating whether emergency electronic brake or blinking/flashing hazard lights of a vehicle have been activated, whether a pre-crash system of a vehicle has been activated, whether an electronic stability program of a vehicle has been activated, whether an anti-lock braking system of a vehicle has been activated, whether an automatic emergency braking system of a vehicle has been activated, a brake warning has been activated, where a collision risk warning has been activated, and so forth.

The foregoing are examples of information in road safety messages that can be transmitted or received by ITS stations. However, in other examples, other types of information can be transmitted or received by ITS stations.

A recipient of information transmitted by an ITS station (where the information can include a V2X message, for example) verifies the authenticity of the information, i.e., that the information was indeed created by an entity that claims to be the sender of the information and that the entity is considered to be trusted by a Certificate Authority (CA). A CA can refer to an entity that is responsible for issuing certificates to ITS stations for use in communications of the ITS stations. A CA can be implemented with one or more server computers, or as machine-readable instructions (e.g., software) executable on one or more processors.

A certificate can be used by a recipient to authenticate the information sent by a sender. A CA is able to revoke a certificate under certain conditions, such as for misbehaving ITS stations. A "misbehaving" ITS station can refer to any ITS station that sends inaccurate, incorrect, misleading, or altered information, whether intentionally (such as by a malicious entity) or unintentionally (such as due to malfunctioning equipment). Inaccurate, incorrect, misleading, or altered information can refer to information transmitted by an ITS station that deviates from an expected information in some way, or that should not have been transmitted by the ITS station.

Malfunctioning equipment can refer to equipment that is not functioning in an expected manner, such as due to an implementation error of the equipment (e.g., the equipment was not designed or built properly) or due to a defect in the equipment (e.g., a sensor is no longer working properly). The transmission of inaccurate, incorrect, misleading, or altered information by an ITS station can be referred to as a misbehavior of the ITS station.

A recipient device (such as a recipient ITS station, for example, a vehicle) that receives V2X information from a sender (such as a sender ITS station, e.g., an RSU) can take action based on the received V2X information. For example, based on the received V2X information, the recipient ITS station may control car brakes or engage the car in lane change maneuvers. If the sender ITS station is misbehaving, then the recipient ITS station would be taking action based on inaccurate, incorrect, misleading, or altered V2X information, which can pose a safety hazard. As noted above, a certificate issued by a CA can be used to ensure that the authenticity of received V2X information can be verified at the recipient ITS station. However, this relies on the premise that any certificate belonging to a misbehaving ITS station is revoked by the CA. Thus, it is important that the CA has a reliable mechanism to assess if an ITS station can be trusted or not (i.e., whether the ITS station is misbehaving). If the ITS station is misbehaving, then the CA revokes the certificate of the misbehaving ITS station.

In some examples, the CA can determine, based on only information available at one or more ITS stations, the plausibility and consistency of received V2X information. However, basing this determination on only information of one or more ITS stations may not allow for a determination of whether an ITS station is misbehaving in a timely manner or with high confidence. For example, relying on reporting of V2X misbehavior by other ITS stations may not allow for a timely determination of ITS stations behavior, since the determination is based on reports from multiple ITS stations, and the multiple ITS stations may take some amount of time to send such reports. In some scenarios, multiple misbehaving ITS stations can collude to avoid the detection of misbehavior.

In accordance with some implementations of the present disclosure, the determination of whether or not an ITS station is misbehaving can be based on information relating to the ITS station provided by a cellular network. A cellular network can refer to a collection of network entities that provides a mechanism for a wireless device, such as an ITS station, to establish a wireless link or connection with the cellular network, and to use resources of the cellular network to communicate with one or more target devices (such as user equipments or UEs, ITS stations, servers, etc.).

FIG. 1 shows an example arrangement that includes a cellular network 102 that includes a cellular access network 104 and a core network 106. The cellular access network 104 includes various access nodes 108 that are able to wirelessly communicate with ITS stations 110 within range of the respective access nodes 108. The access nodes 108 have respective coverage areas, referred to as cells, within which wireless devices are able to access resources of the respective access nodes 108 to establish communication sessions.

An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In an LTE network, the access nodes 108 can be referred to as evolved NodeBs (eNBs). In other types of cellular access networks, the access nodes 108 can be referred to as base stations.

The core network 106 includes various nodes of the cellular network 102 to support the control of communication sessions and the transport of data of ITS stations 110 (and other wireless devices within range of the cellular access network 104).

In accordance with some implementations of the present disclosure, a misbehavior detection function (MDF) 112 can be used for detecting misbehavior of an ITS station. As used here, a "function" can refer to a hardware processing circuit, such as a microprocessor, a core of a multi-core microprocessor, a microcontroller, a programmable integrated circuit device, a programmable gate array, or any other type of hardware processing circuit. Alternatively, an MDF can refer to machine-readable instructions, such as software or firmware. As further examples, an MDF can refer to a combination of a hardware processing circuit and machine-readable instructions executable on the hardware processing circuit.

In some examples, an MDF can be deployed in one network node. In other examples, an MDF can be deployed across multiple network nodes.

FIG. 1 shows the MDF 112 being outside the cellular network 102 in some examples. For example, the MDF 112 can be part of a domain of a CA, a domain of a V2X application server, and so forth. A domain of a CA can refer to an arrangement of resources operated by an entity that manages or operates the CA. A domain of a V2X application server can refer to an arrangement of resources operated by an entity that manages or operates the V2X application server. A V2X application server can provide V2X services for ITS stations.

In alternative examples, the MDF 112 can be part of the cellular network 102. In further examples, the MDF 112 can include a first portion that is part of the cellular network 102, and a second portion that is outside the cellular network 102.

Figure 2:
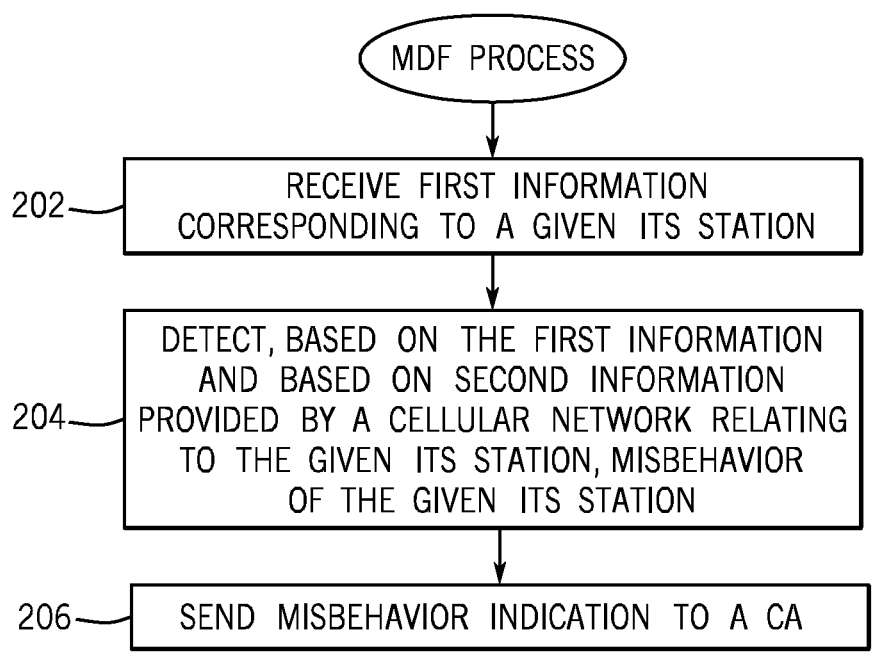
FIG. 2 is a flow diagram of an example process of a misbehavior detection function (MDF) according to some implementations.

FIG. 2 is a flow diagram of an example process performed by the MDF 112. The MDF 112 receives (at 202) first information corresponding to a given ITS station (one of ITS stations 110). In some examples, the first information can include a location information of the given ITS station, where such location information can be provided by the given ITS station.

The MDF 112 detects (at 204), based on the first information corresponding to the given ITS station and based on second information provided by the cellular network 102 relating to the given ITS station, misbehavior of the given ITS station. The second information can be provided by a second information source 114 (see FIG. 1) in the cellular network 102. For example, the second information source 114 can include a location service of the cellular network 102, which is used to determine a location (including position and/or speed and/or direction of travel and/or any other indication of position or movement) of a wireless device that is in communication with the cellular access network 104. Location information of the wireless device acquired by the second information source 114 can be provided to the MDF 112. As used here, the term "location information" can refer to any or some combination of the following: a position (expressed as coordinates, for example), speed, direction of travel, or any other indication of positon or movement. As an example, a location service can include Location Services (LCS) described by 3GPP TS 23.271, in examples where the cellular network 102 is a 3GPP network.

Although the second information source 114 is depicted in FIG. 1 as being outside of the core network 106, it is noted that the second information source 114 (such as one or more nodes to perform LCS) can be part of the core network 106.

In some examples, the detecting of misbehavior of the ITS station based on the first information and the second information can include comparing the first information to the second information (e.g., comparing location information in the first information with the location information in the second information). If there is a mismatch detected based on the comparing of the first information and the second information, then the MDF 112 can indicate the ITS station as a misbehaving ITS station.

In response to detecting a misbehaving ITS station, the MDF 112 can send (at 206) a misbehavior indication to a CA, where the misbehavior indication can be in the form of a message, an information element, or any other information that provides an indication to the CA that misbehavior of the given ITS station has been detected.

In some examples, the CA may optionally gather misbehavior indications from multiple other sources, such as from other ITS stations, before making a decision on whether to revoke certificates. The presence of misbehavior indications from the MDF 112 (that uses information from the trusted cellular network 102) may reduce the number of reports from other ITS stations that are relied on before a certificate revocation decision is made regarding whether or not to revoke a certificate of an ITS station (thereby also reducing the amount of over the air signaling used).

In the ensuing discussion, reference is made to examples where the cellular network 102 is a 3GPP network. It is noted that techniques or mechanisms according to further implementations can be applied with other types of cellular networks, including 5G networks and so forth.

Generally, in some implementations of the present disclosure, the MDF 112 makes use of information that is acquired by the 3GPP network to assess the plausibility of the content of a V2X message and thereby detect misbehavior. A network node in the 3GPP network can be considered a more reliable source of information than corresponding information provided by another ITS station, since the network node in the 3GPP network, such as a network node that performs Location Services (LCS) tasks, may collect its information independently of operations of other ITS stations. An example of a network node that performs LCS tasks include an LCS server that is referred to as a Gateway Mobile Location Center (GMLC).

In addition, ease of deployment and minimization or reduction of new radio infrastructure can be achieved since the MDF 112 detects ITS station misbehavior using information from a 3GPP infrastructure (e.g., the infrastructure relating to LCS) and procedures that already exist.

The MDF 112 builds on techniques relating to trustworthiness based on certificates issued by a CA. Generally, such techniques involve (1) a sender ITS station sending a signed V2X message (along with a certificate of the sender ITS station), to allow a recipient of the V2X message to verify the authenticity of the received V2X message, and (2) a misbehaving ITS station being identified and its certificate being revoked by a CA, by publication of an updated Certificate Revocation List (CRL).

Techniques relating to trustworthiness based on certificates issued by a CA include a sender of a V2X message creating a payload of the V2X message, and generating the digital signature of the V2X message payload using the sender's private key. The V2X message built and sent by the sender contains the following components: the message content (payload), a generated digital signature of the message generated using the private key of the sender, and optionally, a certificate of the sender. The certificate of the sender includes the sender's public key (or includes information to enable computation of the sender's public key), the sender's identity, a digital signature block that is generated using the private key of the CA and the identity of the CA that has signed the certificate. If the certificate of the sender is not included in the V2X message, then it is assumed that the certificate can be retrieved by the receiver (i.e., available at the receiver) based on the sender's identity (e.g. based on the source of the V2X message).

Upon receiving the V2X message sent by the sender, the receiver applies the CA's public key to the sender's certificate's signature block to verify (i.e., to associate) the identity of the sender to the public key of the sender. The receiver checks that the certificate of the sender is not revoked (i.e., the certificate of the sender does not correspond to a certificate in the Certificate Revocation List (CRL)). If the sender's certificate is in the CRL, then the received V2X message is discarded by the receiver. The receiver checks that the identity in the certificate corresponds to (e.g., the same as the) identity in the message payload. The receiver uses the public key of the sender to verify the signature included in the V2X message.

1. Examples of Information Elements in V2X Messages Used to Detect Misbehaving ITS Stations The following describes V2X information in V2X messages (also referred to as "V2X application layer messages") that can be verified using independent 3GPP-based information validation, for the purpose of detecting misbehavior of an ITS station.

As noted above, the MDF 112 can verify V2X information based on location information of the 3GPP LCS domain (i.e., at one or more LCS nodes). The location information can be acquired using any existing LCS techniques, or based on other types of location techniques of cellular networks, such as location techniques provided by a Metropolitan Beacon System (MBS) or other type of system. The V2X information to be verified can include any or some combination of the following: location, speed, acceleration, direction of travel, V2X indications (such as "slow vehicle," "wrong way driving," "stationary vehicle," "traffic jam," "pre-crash warning," "emergency electronic brake lights," etc.), or any other information that indicates a location or motion of an ITS station.

Examples of V2X information elements of V2X messages are listed in the first column of Table 1 below. The second column of Table 1 lists information from the 3GPP network that can be used to verify the plausibility of the respective V2X information elements.

TABLE 1

| V2X information element ("first information" of FIG. 2) | Information of 3GPP network used to verify the V2X information element ("second information of FIG. 2) |
|---|---|
| Position (latitude, longitude, elevation, Global Positioning System (GPS) coordinates, etc.) | Location information obtained by 3GPP-based positioning techniques |
| Speed or other V2X indications, such as "slow vehicle," indication, "stationary vehicle" indication, or "traffic jam" indication | Speed computed based on location measurements taken at different times using the 3GPP-based positioning techniques, or speed received from the 3GPP-based location services |
| Direction of travel | Direction computed based on location measurements taken at different times using the 3GPP-based positioning techniques, or direction received from the 3GPP-based location services |
| Braking/deceleration, or "pre-crash warning" indication, or "emergency electronic brake lights" indication | Braking computed based on position or speed measurements taken at different times (differential of the speed values computed above) using the 3GPP- based positioning techniques |
| Acceleration, or "pre-crash warning" indication, or "emergency electronic brake lights" indication | Acceleration computed based on position or speed measurements taken at different times (differential of the speed values computed above) using the 3GPP- based positioning techniques |

2. Architecture and Messaging

Figure 3:
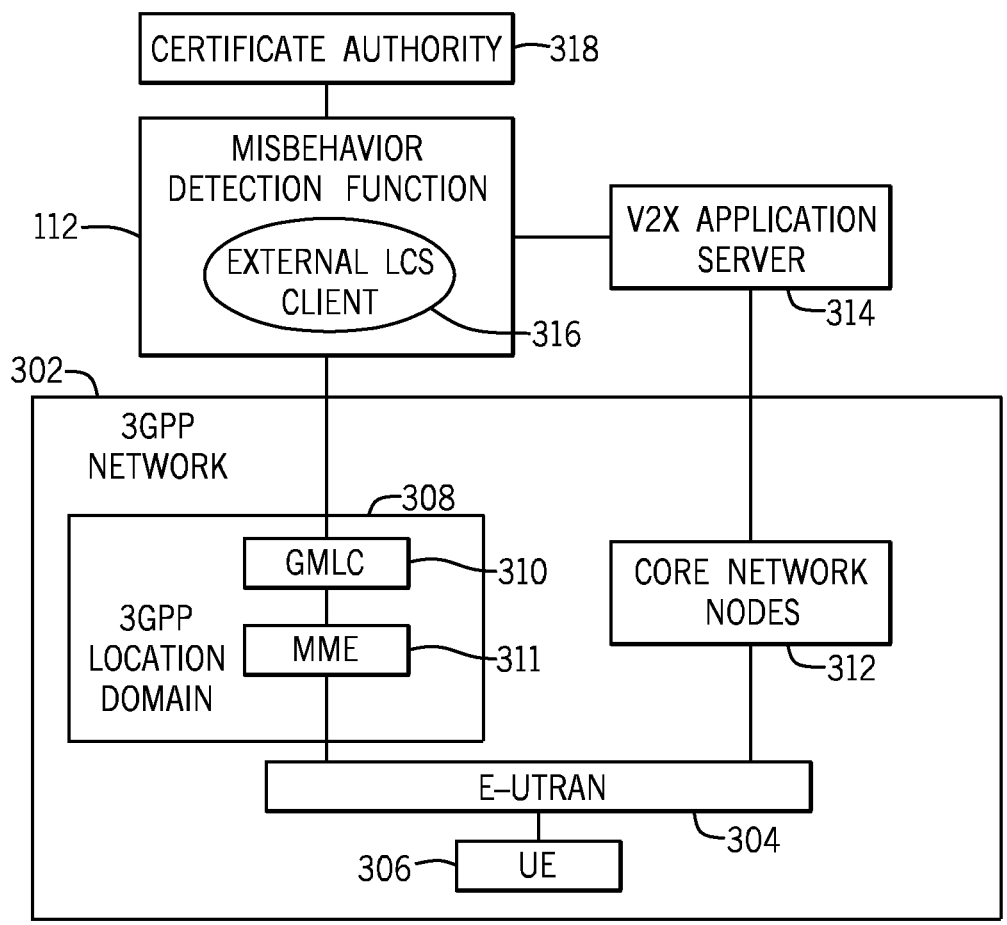
FIGS. 3 and 4 are block diagrams of different example architectures according to various implementations.
Figure 4:
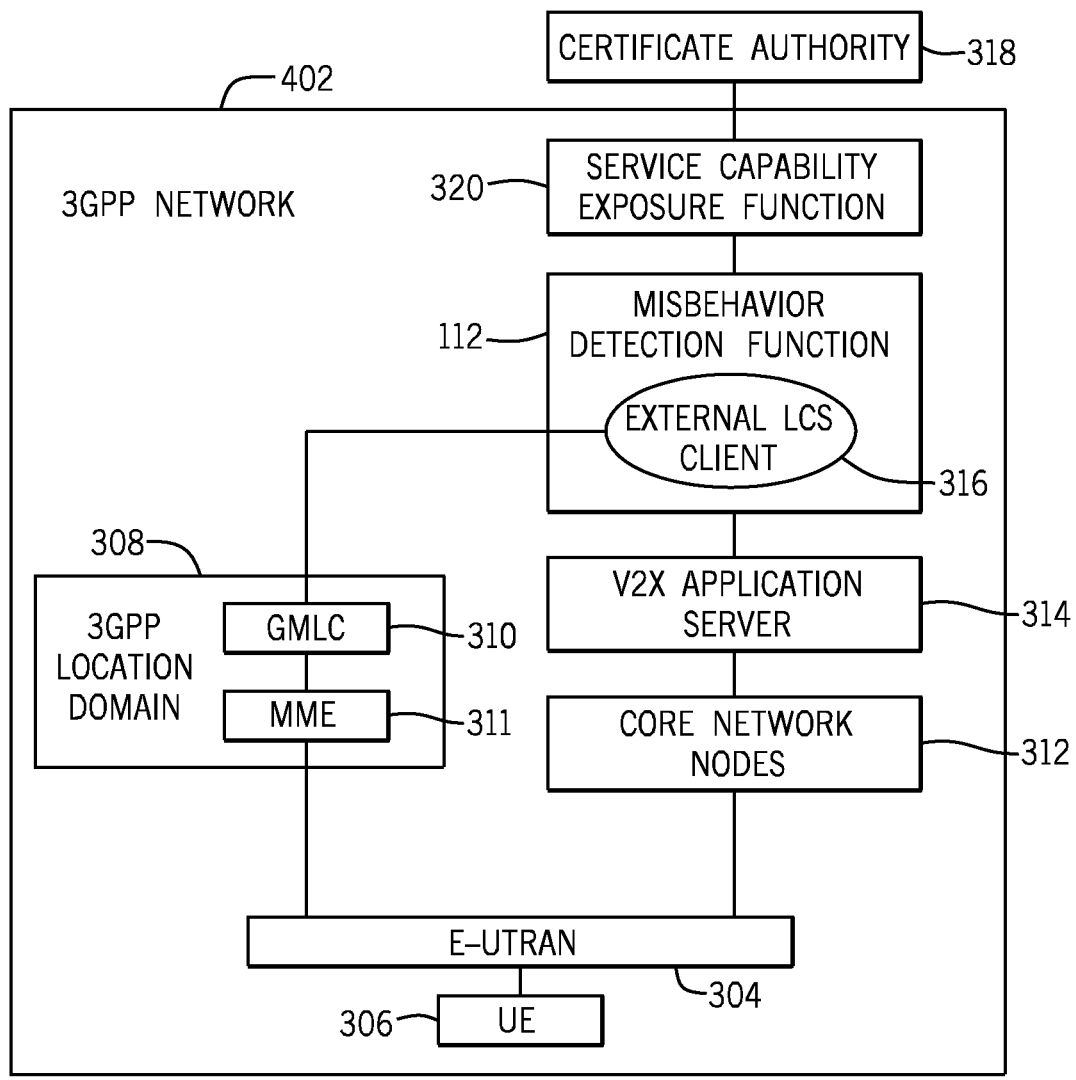

FIGS. 3 and 4 illustrate examples of different architectures in which implementations of the present disclosure can be provided. FIG. 3 shows an arrangement where the MDF 112 and a V2X application server 314 are outside a 3GPP network 302, and FIG. 4 shows an arrangement where the MDF 112 and the V2X application server 314 are inside a 3GPP network 402.

In FIG. 4, the MDF 112 that is inside the 3GPP network 402 can be referred as MDF_3GPP. In some examples, there can also be another MDF in the CA domain, which can be referred to as MDF_CA.

Although FIGS. 3 and 4 depict two examples of specific architectures that can be used, it is noted that in other examples, other architectures can be used. For example, the MDF 112 can be inside a 3GPP network, while the CA 318 is outside the 3GPP network, or vice versa.

The 3GPP network 302 or 402 includes an EUTRA Network (E-UTRAN) 304, which is an example of the cellular access network 104 of FIG. 1. A user equipment (UE) 306 is a wireless device that is able to wirelessly communicate over the E-UTRAN 304. An example of the UE 306 can include an ITS station.

The 3GPP network 302 or 402 includes a 3GPP location domain 308 that is able to gather location information according to 3GPP LCS (sometimes also referred as "UE Positioning"), in some examples. The 3GPP location domain 308 includes a GMLC 310.

In addition, the 3GPP location domain 308 also includes a mobility management entity (MME) 311, which provides mobility session management, user authentication, roaming, handovers, and other tasks for wireless devices. In addition, the MME 311 can provide a Cell Identity, which identifies a cell (and the eNodeB providing the cell) that is serving the UE 306. In some cases, a Cell Identity can be an example of location information that can be provided by the cellular network.

The 3GPP network 302 or 402 further includes core network nodes 312 (which are part of a core network of the 3GPP network) that allows the UE 306 to communicate through the E-UTRAN 304 with an entity outside the 3GPP network 302. It is noted that the MME 311 and GMLC 310 are also part of the core network.

In FIG. 3, the MDF 112 and the V2X application server 314 are outside the 3GPP network 302. The CA 318 is also outside the 3GPP network 302. In contrast, in FIG. 4, the MDF 112 and the V2X application server 314 are part of the 3GPP network 402, but the CA 318 is outside the 3GPP network 402. In FIG. 4, the MDF 112 (in the 3GPP network 402) can communicate with the CA 318 through a Service Capability Exposure Function (SCEF) 320.

The V2X application server 314 can provide V2X information (an example of "first information" of FIG. 2) of a given ITS station to the MDF 112, and the GMLC 310 can provide the 3GPP network acquired location information (an example of "second information" of FIG. 2) to the MDF 112. The MDF 112 includes an external LCS client 316 that is able to obtain location information for a given ITS station by sending a request for location information from the GMLC 310.

An LCS client (e.g., 316) is a logical functional entity that requests, from the LCS server (GMLC 310) location information (e.g., position information, velocity information, direction information, etc.), for one or more target UEs, such as according to 3GPP TS 36.305. The external LCS client 316 resides in an entity that is outside the network of the 3GPP network 302. In other examples, an LCS client may reside in an entity (including the UE) within the network of the 3GPP network 302.

In other examples, location information can be obtained for other types of cellular networks, such as according to 3GPP TS 43.059 for a GSM (Global System for Mobile) EDGE (Enhanced Data Rates for GSM Evolution) Radio Access Network (GERAN), or according to 3GPP TS 25.305 for a UTRAN.

Techniques for obtaining location information of UEs can include network-based location techniques, or UE-based location techniques. Such techniques can be based on any or some combination of the following: positioning based on measurements of a Global Navigation Satellite System (GNSS), positioning based on measurements of downlink signals from eNodeBs or other base stations with known geographical coordinates (such as by using OTDOA or Observed Time Difference Of Arrival of the downlink signals), positioning based on based on a UE's serving eNodeB and cell, positioning further based on additional UE and/or E-UTRAN radio resource and other measurements (e.g., Rx-Tx time difference, received signals power and quality), positioning based on measurements of uplink signals from a UE (such as by using UTDOA or Uplink Time Difference of Arrival of uplink signals), and so forth.

The external LCS client 316 requests (e.g., by sending a Location Service Request message) location information for a UE from the LCS server (the GMLC 310). The GMLC 310 passes the request to the LCS functional entities in the core network. The UE Identity used to identify the UE in the Location Service Request message from LCS client 316 to GMLC 310 can be the Mobile Station International Subscriber Directory Number (MSISDN) or International Mobile Subscriber Identity (IMSI).

The GMLC 310 can send a Location Service Response to the LCS client 316 in response to the Location Service Request. The attributes (parameters) in the Location Service Response can include the location of the UE (expressed as a shape as defined in 3GPP TS 23.032 or local coordinate system, for example), and a timestamp of the location estimate and the velocity (including speed and direction in two dimensions or three dimensions) of the UE (also as defined in 3GPP TS 23.032, for example). An indication as to whether the UE enters, is within or leaves a geographical area may also be included. The UE Identity used in the Location Service Response can be the MSISDN or a Session Initiation Protocol Uniform Resource Identifier (SIP-URI). If a static or dynamic Internet Protocol (IP) address (IPv4 or IPv6) has been allocated for the UE, an IP address can be used in some examples as the UE Identity.

The CA 318 can initiate or be triggered to perform a misbehavior verification procedure using the MDF 112.

For example, the CA 318 can trigger 3GPP-based misbehavior detection related to a given ITS station in response to the CA receiving a misbehavior report relating to a given ITS station directly from another V2X entity (e.g., another ITS station or an MDF).

Alternatively, the CA 318 can detect misbehavior by receiving misbehavior reports about a set of misbehaving ITS stations. Such misbehavior reports may be triggered by MDF(s). These reports include information related to misbehavior (e.g., inconsistent V2X information) and are sent to the CA 318 either periodically or upon detecting a misbehavior event.

As another example, the CA 318 can poll one or more MDFs prior to a periodic trigger at the CA 318, such as a periodic issuance of Certificate Revocation Lists and/or periodic reissuance of the V2X certificates, etc.

In some examples, procedures can also be used by the MDF 112 to detect misbehavior and to send related misbehavior reports to other entities such as the CA 318.

For example, the MDF 112 may receive a misbehavior verification request from the CA 318 and initiate the collection of V2X information and of related location information from the 3GPP location domain 308 corresponding to the ITS station identified in the misbehavior verification request. The MDF 112 further compares the information from the V2X domain and the 3GPP location domain 308 to determine misbehavior of the ITS station and sends a response to the CA 318 based on the determination.

Alternatively, the MDF 112 may autonomously detect misbehavior (i.e., without an explicit misbehavior detection trigger from the CA 318 or from another node) by observing received V2X information (from an ITS station) and comparing the V2X information with the corresponding information from the 3GPP location domain 308 for the ITS station. Upon detecting any misbehavior, the MDF 112 may either generate and transmit a misbehavior report to the CA 318, or the MDF 112 may store the misbehavior information until the CA 318 requests a misbehavior report from the MDF, which transmits the misbehavior report to the CA 318 upon receiving such a request.

In alternative examples, the MDF 112 can receive misbehavior reports from ITS stations, where such misbehavior reports can act as triggers for the MDF 112 to initiate collection of corresponding V2X information of an ITS station from the 3GPP location domain 308.

3. Example Message Sequences

The following describes examples of processes for detecting a misbehaving ITS station and for revoking certificates of such misbehaving ITS station.

Figure 5:
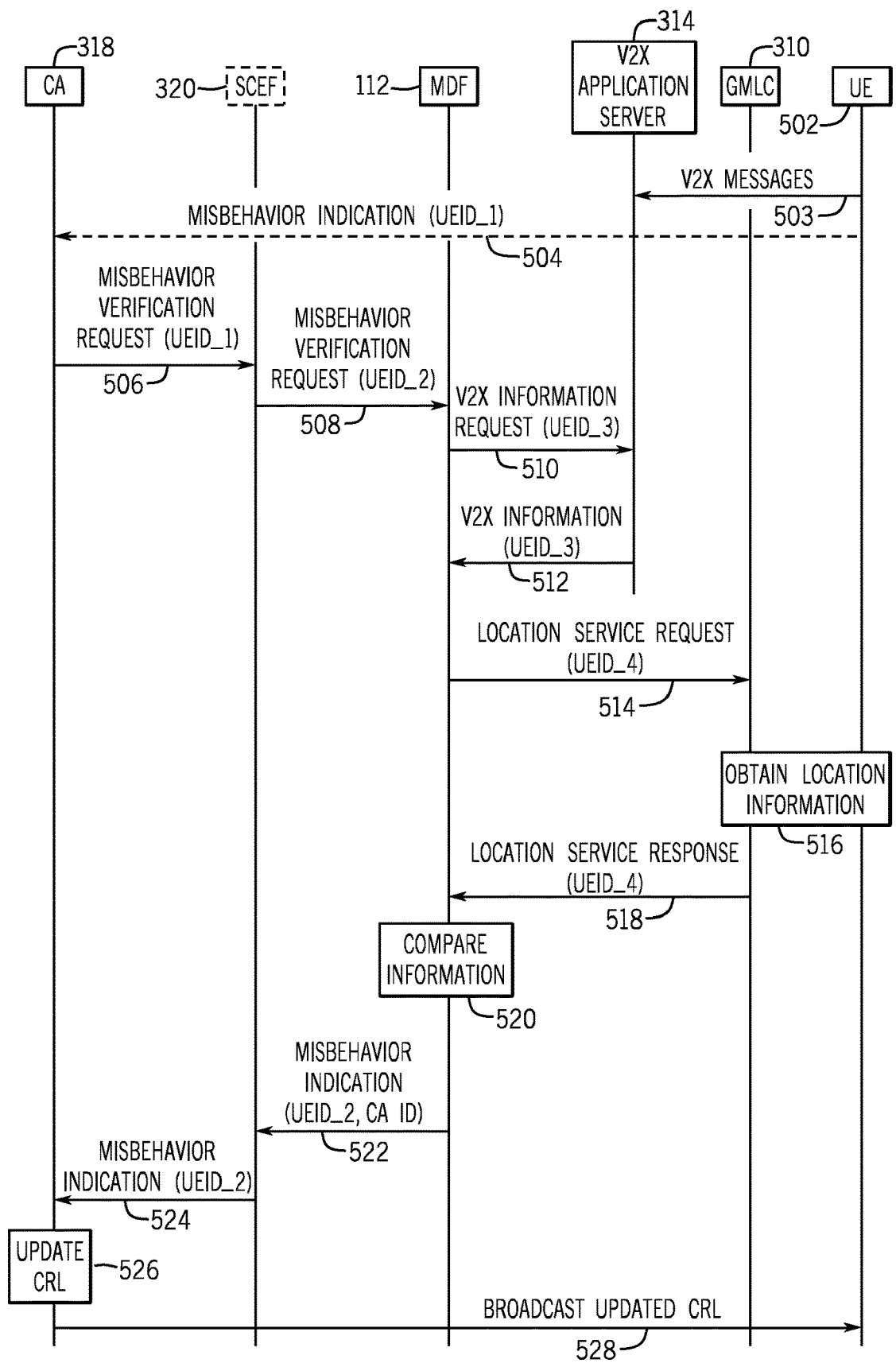
FIGS. 5-7 are flow diagrams of example processes according to various implementations.

FIG. 5 is a flow diagram of a CA-initiated misbehavior verification process, using the architecture of FIG. 4, according to some examples.

In other examples, a similar process can be performed using the architecture of FIG. 3 (where the SCEF 320 is omitted).

The process of FIG. 5 includes a number of tasks, numbered starting at 504.

Task 503: UEs (such as ITS stations) can send V2X messages (discussed further above) to the V2X application server 314, on a periodic basis or in response to specified events.

Task 504: One or more UEs (each referred to as a "detecting UE") are able to receive an anomalous V2X message originating from a UE (more specifically, an ITS station) suspected of misbehavior (referred to as a "suspicious UE"). In response, the one or more detecting UEs 502 transmit a misbehavior indication message to the CA 318. The misbehavior detection at the detecting UE(s) may be based on a number of criteria. For example, a detecting UE (e.g., an ITS station such as a vehicle) can use local sensors to make measurements on a target UE, which can be an ITS station such as another vehicle. The measurement made can include the target UE's speed, location, and so forth. The measured information can be compared to the information in the V2X message. If a mismatch is detected, then the detecting UE can send a misbehavior indication. In other examples, a detecting UE can detect a suspicious UE using other techniques.

The V2X message can include a UE Identity (e.g., UEID_1) of the suspicious UE, which enables the CA 318 to identify the suspicious UE and retrieve its certificate and other security credentials. In addition, UEID_1 can also enable the CA 318 to obtain another UE Identity (e.g., UEID_2) of the suspicious UE within the V2X domain using an identity conversion process as discussed further below in Section 5.

Note that task 504 may be omitted in other examples.

Task 506: The CA 318 can initiate a misbehavior verification procedure by transmitting a misbehavior verification request via the SCEF 320 (depending on the architecture used) to the MDF 112 located in the 3GPP network 402. Note that the misbehavior verification procedure can be initiated by the CA 318 in response to the misbehavior indication(s) received from the detecting UE(s) 502. In other examples, the CA 318 can initiate the misbehavior verification procedure autonomously based on other criteria.

The misbehavior verification request can optionally include the identity of the suspicious UE (e.g., UEID_2) to be monitored in the V2X domain. Optionally the misbehavior verification request may just indicate that the 3GPP network should monitor a group of ITS stations, or all ITS stations, and provide misbehavior reports on any that are found to be misbehaving.

Task 508: If the FIG. 4 architecture is used, the SCEF 320 relays messages between CA 318 and the MDF 112. In other architectures, the SCEF 320 may be omitted. In the FIG. 5 example, the SCEF 320 relays the content of the misbehavior verification request (including UEID_2) to the MDF 112. In other examples, the misbehavior verification request may be directly sent by the CA 318 to the MDF 112.

Task 510: In response to receiving the misbehavior verification request for the suspicious UE identified by UEID_2 from the CA 318, the MDF 112 initiates a procedure for collecting the corresponding V2X information from the V2X application server 314 by transmitting a V2X information request including a UE Identity (UEID_3) that identifies the suspicious UE within the V2X application server 314. UEID_3 is used to identify the suspicious UE in the V2X application server domain.

Task 512: The V2X application server 314 responds with the V2X information corresponding to the identified UE (UEID_3).

Task 514: The MDF 112 collects LCS information of the suspicious UE by transmitting a Location Service Request to the GMLC 310. A different UE ID (UEID_4) may be used to identify the UE in the LCS domain.

Task 516: If the corresponding location information of the UE is unavailable at the GMLC 310, the GMLC 310 can obtain the location of the suspicious UE using any of various techniques, such as based on GNSS measurements, measurements of downlink signals, measurements of uplink signals, Cell Identity information, and so forth.

In an optional enhancement, the MDF 112 may configure the LCS domain such that the capture of future location information is synchronized with the timing and periodicity of the V2X message reporting of the ITS station that is being monitored.

Task 518: In response to the Location Service Request, the GMLC 310 can transmit the corresponding location information in a Location Service Response (containing UEID_4) to the MDF 112.

Note that tasks 514 and 516 may be initiated and completed before tasks 510 and 512 since these are independent tasks. These tasks may also be performed concurrently.

Task 520: The MDF 112 then compares the retrieved V2X information (from the V2X application server 314) with the information in the Location Service Response, and assesses potential inconsistencies that may indicate a misbehavior of the suspicious UE.

Task 522: In response to the misbehavior verification request, the MDF 112 generates a misbehavior indication (e.g., a misbehavior verification response) and transmits the misbehavior indication to the CA 318 or to the SCEF 320. Note that in case of multiple CAs, the MDF 112 selects a CA from the multiple CAs (see Section 6 below) to which the misbehavior indication is routed. The misbehavior indication includes the identity of the selected CA in the response message transmitted through SCEF 320.

Task 524: The SCEF 320 (if present) routes the misbehavior indication to the requesting CA 318.

Task 526: The CA 318 updates a Certificate Revocation List (CRL) based on the received misbehavior verification response. Specifically, if the misbehavior verification response indicates that certain ITS station(s) is (are) misbehaving, the CA 318 can use this information (possibly in conjunction with other information) to revoke the certificate(s) corresponding to the misbehaving ITS station(s), and update the CRL accordingly. Conversely, if the MDF 112 indicates no misbehavior, then the CA 318 will not revoke the certificates of ITS stations.

Task 528: The CA 318 transmits (e.g., by broadcast or multicast) the updated CRL using one of various CRL delivery mechanisms to UEs.

The UEIDs (UEID_1 to UEID_4 in the above example) uniquely identify the suspicious UE in various domains. In some examples, all these UEIDs may contain the same value. Further details of conversion between UE IDs is explained in Section 5 below.

In FIGS. 4 and 5, the MDF 112 and V2X application server 314 are shown as two separate nodes with inter-node communication messages being exchanged between them. In other examples, the MDF 112 and V2X application server 314 may be part of the same node (e.g., the MDF functionality may be integrated into the V2X application server 314). In such examples, the messages between the MDF and V2X application server are internal communications aspects within the V2X application server 314.

Figure 6:
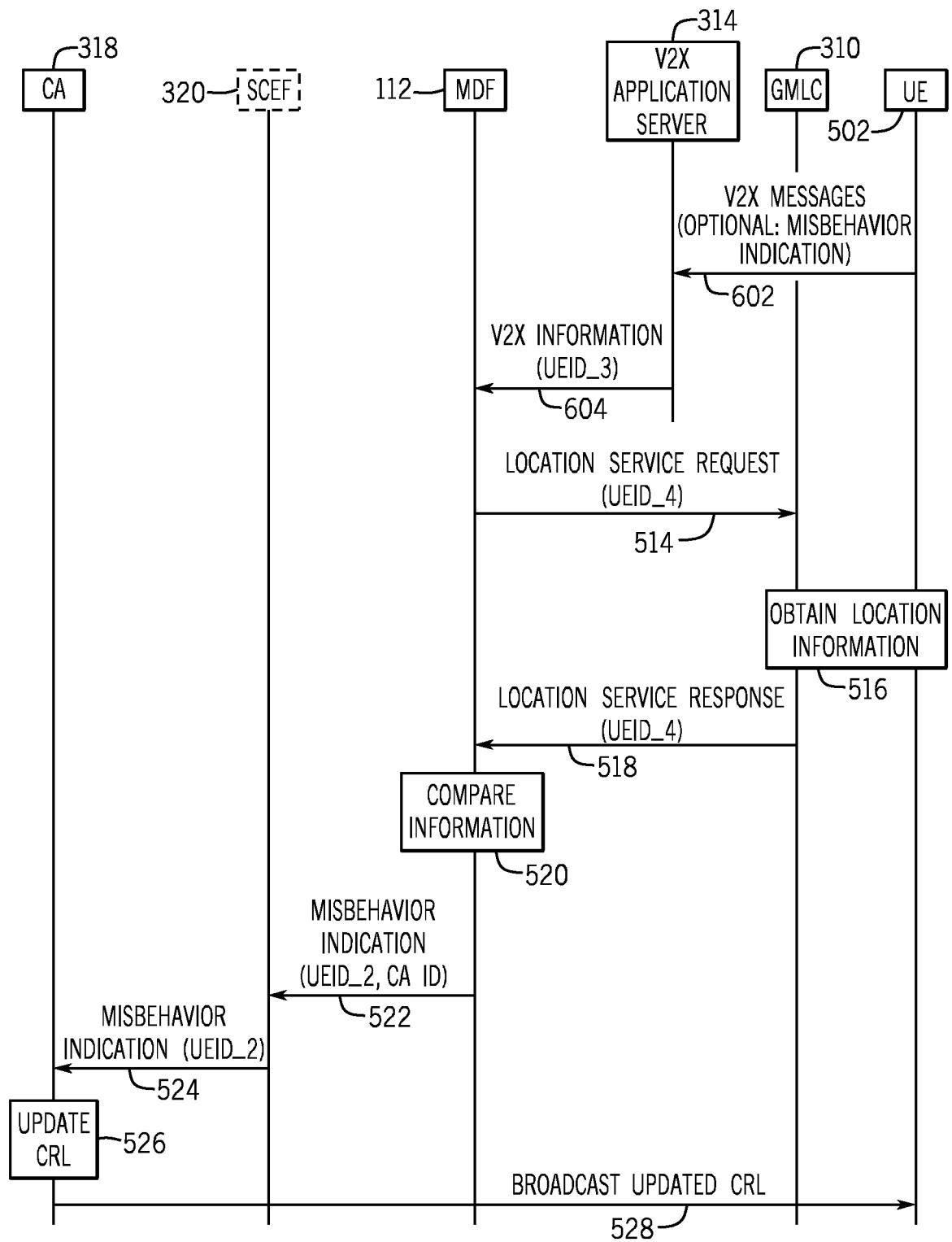

FIG. 6 is a flow diagram of a misbehavior verification process in which a misbehavior indication is generated autonomously by the MDF 112. FIG. 6 shows an example that uses the architecture of FIG. 4. In other examples, a similar process can be performed using the architecture of FIG. 3 (where the SCEF 320 is omitted).

Task 602: UEs (such as ITS stations) can send V2X messages (discussed further above) to the V2X application server 314, on a periodic basis or in response to specified events. Alternatively or in addition, one (or more) detecting UEs may receive a V2X message and detect that another UE is exhibiting anomalous behavior. The detecting UE(s) can then transmit a misbehavior indication message to the V2X application server 314 regarding the misbehaving UE. The misbehavior detection at the detecting UE may be based on a number of criteria as noted above. The misbehavior indication message may include a UE Identity (UEID_3) of the potentially misbehaving UE, to enable the V2X application server 314 to identify the potentially misbehaving UE and retrieve its other corresponding identities in the LCS domain and CA domain.

Task 604: In response to receiving the misbehavior indication, the V2X application server 314 passes the UE Identity of the potentially misbehaving UE to the MDF 114 in a V2X information message.

Tasks 514 to 528 in FIG. 6 are similar to the corresponding tasks of FIG. 5.

Figure 7:
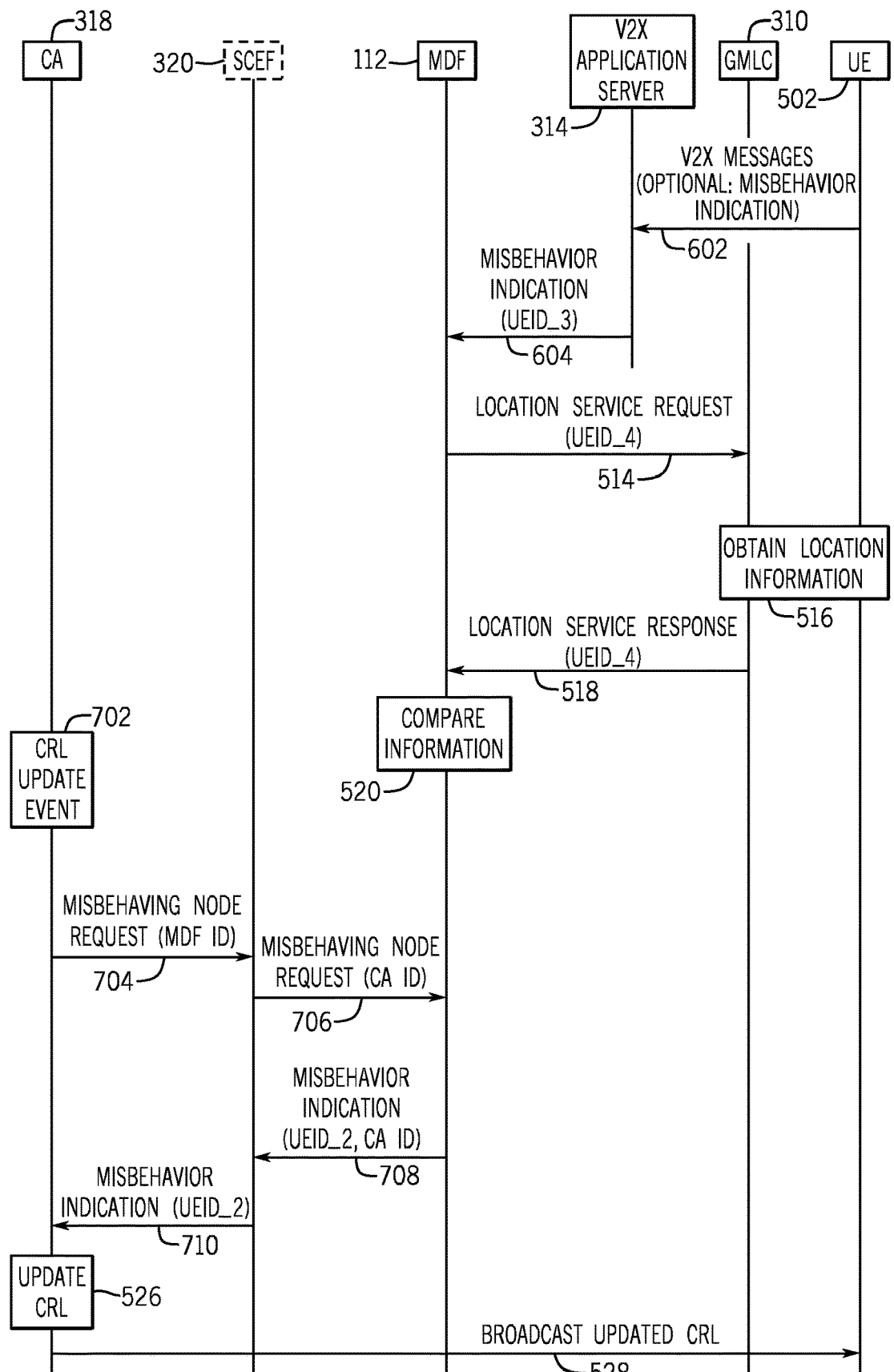

FIG. 7 is a flow diagram of a misbehavior verification process in which a misbehavior indication is generated autonomously by the MDF 112 upon request from the CA 318. FIG. 7 shows an example that uses the architecture of FIG. 4. In other examples, a similar process can be performed using the architecture of FIG. 3 (where the SCEF 320 is omitted).

Tasks 602, 604, 514, 516, 518, and 520 in FIG. 7 are similar to corresponding tasks of FIG. 6.

Task 702: The CA 318 may periodically check with the MDF 112 if any new information regarding misbehaving UEs is available at the MDF 112. This may happen for instance before a CRL update event (which may be periodic).

Task 704: To update the CRL, the CA 318 transmits a misbehaving node request to the MDF 112.

Task 706: The misbehaving node request may be routed to the appropriate MDF by the SCEF 320 using the MDF Identity included in the misbehaving node request. The routing can be performed in an example scenario where there are multiple MDFs connected to the same CA.

Task 708: The MDF 112 then generates a misbehavior indication message, which includes the identify of each misbehaving ITS station that has been detected between the last misbehavior indication message (sent to the requesting CA) and the current misbehaving indication message. The MDF 112 sends the generated the misbehavior indication message.

Task 710: The SCEF 32 routes the misbehavior indication message to the requesting CA based on the optional CA Identity included in the misbehavior indication message from the MDF 112.

The remaining tasks 526 and 528 are similar to corresponding tasks of FIG. 6.

4. Architectural Variations

There are a number of potential architecture variations compared to the architectures depicted in FIGS. 3 and 4.

The MDF 112 may be located within the V2X application server 314 (e.g., in the same network node).

There may be multiple MDFs.

In the case where there are two MDFs, there can be one MDF (MDF_CA) within the CA domain and another MDF (MDF_3GPP) within the 3GPP network. The MDF_3GPP may provide reports to MDF_CA, where MDF_CA may also gather misbehavior reports directly from ITS stations.

In examples where there is a single MDF (MDF_CA), this MDF may gather information both from ITS stations and the 3GPP network. The MDF can gather information from the 3GPP network by gathering the information directly from either (1) the V2X application server 314 and the LCS domain 308, or (2) from the SCEF 320.

The SCEF 320 may or may not be present. In examples where the SCEF 320 is present, the SCEF 320 may provide an interfacing functionality between the CA domain and the MDF_3GPP, or between the CA 318 and both the V2X application server 314 and the LCS domain 308.

The MDF_3GPP functionality may be logically incorporated or physically co-deployed on hardware, at locations of other nodes which include any or some combination of the following: the MDF_CA, the V2X application server 314, a V2X control function (that controls V2X tasks), the SCEF 320, and the GMLC 310.

Certain functionality may reside either inside or outside the 3GPP network, including the MDF_3GPP and/or the V2X application server 314.

Location information may be supplied by any or some combination of the following: an LCS entity (e.g., the GMLC 310), or a cellular network core network node, including the MME 311, a Mobile Switching Center (MSC), a Serving GPRS (General Packet Radio Service) Support Node (SGSN). The core network node may know a UE's location with some accuracy or granularity level for call connection or packet data network (PDN) connection routing and paging purposes. For example, the core network node can provide a Cell Identity, information of a location area, information of a tracking area, and so forth. Such information can be combined with information from a database that provides mapping of 3GPP location areas (e.g., a cell, a routing area, a tracking area, etc.) to geographical locations.

The 3GPP network may gain access to the content of a V2X message at (1) a V2X application server that is co-located with or connected to an RSU, where the RSU receives V2X messages over a PC5 interface, or (2) a V2X application server that receives V2X messages that have been sent over a Uu uplink unicast interface and that may optionally re-broadcast those messages on the downlink on a Multimedia Broadcast Multicast Services (MBMS) interface.

In some examples, support for cellular roaming by an ITS station is provided. For example, an ITS station may be roaming on a visited network (VPLMN). The observation of V2X messages and 3GPP determined location information may be performed in either in the VPLMN or in the HPLMN. The 3GPP architectures support V2X application servers in both the HPLMN and VPLMN. Also, GMLCs can be supported in both the VPLMN and HPLMN, and the SCEF can be deployed in either HPLMN or VPLMN. There may be benefits in the MDF_3GPP being deployed in the VPLMN, since V2X messages (contents of which are to be inspected) are often delay sensitive and forwarding to the HPLMN may not make sense, and because 3GPP location tracking is more of a VPLMN function (e.g., based on VPLMN Cell Identity, VPLMN BTS triangulation, etc.).

The CA can request that misbehavior detection be performed on a particular ITS station through one of two mechanisms. First, if the CA knows the VPLMN that an ITS station is roaming on then the CA can send a Misbehavior Reporting Configuration message directly to the VPLMN. Second, if the CA knows the HPLMN that is associated with an ITS station, then the CA can send a Misbehavior Reporting Configuration message directly to the HPLMN. Techniques for routing Misbehavior Reporting Configuration messages to the appropriate PLMN are described further below.

5. Identity Management

In some implementations of the present disclosure, for any given ITS station, different identities of the given ITS station are used in respective different domains to ensure privacy of the given ITS station and to prevent tracking of the given ITS station by an unauthorized entity. In some examples, mapping between the different identities of a given ITS station can be performed, such as between the identity of the given ITS station used by a CA and an identity (or multiple identities) of the given ITS station used for purposes of determining the given ITS station's location in the 3GPP network.

In some implementations, the MDF 112 can provide a mapping between the source IP address at which a V2X message arrives and the application layer identity (pseudonym) that is used within the V2X message. Using the source IP address, the MDF can perform a lookup of identities such as MSISDN or IMSI that can then be supplied to the LCS domain 308. This lookup can be made by querying the MME 311 (FIG. 3 or 4) or a packet gateway (P-GW), which is a core network node (e.g., a core network node 312 in FIG. 3 or 4) for routing data packets.

Domain 1: Communication Between CA Domain and UEs (UEID_1 in FIGS. 5-7)

Identities in Domain 1 are those that are currently used in the V2X messages and the certificates that are sent along with the V2X messages.

The identity used in a certificate may be a pseudonym (referred to as "pseudonym_cert") and provides the privacy feature of pseudonymity as provided by International Organization for Standardization/International Electrotechnical Commission (ISO/IEC) 15408-2. A pseudonym refers to a disguised identity (a temporary identity) used to identify a respective entity, but the pseudonym does not disclose the true identity (or canonical identity) of the respective entity. Pseudonyms may be changed relatively frequently (say every 5 minutes or other time interval, for example), which provides the privacy feature of unlinkability (as provided by ISO/IEC 15408-2) over long periods of time. Unlinkability ensures that a system is able to make multiple uses of resources or services without others being able to link the resources or services together.

Efficient techniques of provisioning large numbers of certificates (with corresponding pseudonyms) and revoking certificates may be achieved based on for example the Butterfly Key Expansion mechanism.

Domain 2: Communication Between MDF_3GPP and CA Domain (UEID_2 in FIGS. 5-7)

Identities in Domain 2 are used in messages between an MDF in a 3GPP network and the CA domain. Such an identity can be in the form of a pseudonym_cert (pseudonym used in a certificate). In some examples, a complete set of already existing pseudonyms, or the information required to determine a current pseudonym of an ITS station (e.g., a seed plus an expansion formula that enables derivation of these pseudonyms), can be provided to the MDF_3GPP so that the MDF_3GPP can determine the identity of the ITS station and the corresponding pseudonym the ITS station currently uses.

In this manner, the MDF_3GPP can determine the identity of a specific ITS station and to convert this identity to corresponding identities in other domains and hence provide misbehavior reports relating to the specific ITS station even as the pseudonyms of the specific ITS station are changing over time.

Domain 3: Communication Between MDF_3GPP and V2X Application Server (UEID_3 in FIGS. 5-7)

Identities in Domain 3 are used in messages between an MDF in a 3GPP network and a V2X application server.

Such an identity can be in the form of a pseudonym_cert (a pseudonym used in a certificate), or set of pseudonym_certs.

Domain 4: Communication Between MDF_3GPP and LCS/GMLC (UEID_4 in FIGS. 5-7)

According to 3GPP TS 23.271, an LCS client may indicate the identity of a target UE for which the LCS client wants the location using either a verinym or a pseudonym. The pseudonym in Domain 4 (referred to as "pseudonum_LCS") is different from a pseudonym_cert used in a certificate. The verinym can include an MSIDSN, an IMSI, a SIP-URI, or an IP address.

Domain 5: Communication Between UE and V2X Application Server

A communication between a UE and a V2X application server is performed by using IP addresses for identification of the UE and the V2X application server. In some examples, the UE's IP address may be changed by the UE periodically to prevent tracking. Moreover, the UE's IP address may potentially change as the ITS station moves from RSU to RSU, where each RSU has a different Local Gateway that allocates a respective different IP address.

Mapping Identities

To obtain a location report regarding a target UE (e.g., a suspicious ITS station), an LCS client (e.g., the external LCS client 316 of the MDF 112 in FIG. 3 or 4) provides (to the GMLC 310) in a Location Service Request (e.g., task 514 in FIG. 5, 6, or 7) either (1) a verinym of the target UE (e.g., MSIDSN, IMSI, SIP-URI, or IP address), or (2) a pseudonym_LCS of the target UE (where the LCS domain is capable of deriving the verinym based on the pseudonym_LCS using methods described in 3GPP TS 23.271).

If the identity used in the Location Service Request is a verinym such as an IP address, the LCS client can map a pseudonym_cert to a particular IP address, by recording the source IP address of a packet that carried the V2X message (note that the V2X message carries the identity pseudonym_cert). Note that it would be possible for a malicious UE to include a wrong IP address (IP spoofing). However, a Packet Gateway (P-GW) knows the IP address that has been assigned to a target UE and can verify at reception whether the source IP address is valid or not in order to prevent IP spoofing. In accordance with some implementations of the present disclosure, when IP spoofing is detected, the 3GPP network (e.g., the P-GW, Gateway GPRS Support Node (GGSN), MDF_3GPP or V2X application server) can send a misbehaving indication (e.g., "Identity Usurp") to the CA.

If the identity used in the Location Service Request is a verinym such as an MSISDN, IMSI, or SIP-URI, a mechanism is provided by which the LCS client in the MDF_3GPP can derive such an identity. This identity can be derived from the source IP address of a packet that carried the V2X message (the V2X message including a certificate marked with pseudonym_cert). Possible mechanisms are discussed below.

First, if a static IP address is assigned (as part of a subscription of a target UE), then during an attach or a PDN connection setup procedure by the target UE, the MME obtains this static IP address from a Home Subscriber Server (HSS) and passes the static address to a Serving Gateway (S-GW) (another core network node) and then to the P-GW. In this case, the MME knows the IMSI, MSISDN, and source IP address. Hence the MDF can access the MME to look up IMSI and MSISDN corresponding to a particular IP address. Likewise the S-GW and P-GW can also have been provided with this IMSI and IP address information and are capable of mapping between the two. Another alternative is that the MDF_3GPP accesses the P-GW to look up the IMSI corresponding to the source IP address.

Second, if a dynamic address is assigned (or indeed if a static IP address is assigned) to the target UE, the LCS client in the MDF_3GPP or the GMLC can directly access the target UE (targeting the UE using a source IP address) to cause the target UE to initiate location reporting (as discussed above).

Third, if a dynamic address is assigned but the MDF_3GPP prefers to initiate location reporting from the network, i.e., towards the GMLC using IMSI or MSISDN as an identifier, then these identities (MSISDN, IMSI) can be included in a Create Session Request message from the MME to the S-GW and then from the S-GW to the P-GW. As a result, the P-GW can know the mapping between IMSI or MSISDN and the IP address that the P-GW is responsible for allocating for that session. Hence in this case the MDF_3GPP can access the mapping information (that maps between identities) from the P-GW.

In another option (as opposed to using LCS), the MDF_3GPP can pass the source IP address to the MME so that the MME can look up a corresponding E-UTRAN Cell Global Identity (ECGI). The ECGI (an example of a Cell Identity) may in turn be used to provide a somewhat granular level of location information providing the MDF_3GPP is also provided with access to a database that provides a mapping between each ECGI and a specific geographical region.

If the MDF_3GPP is located outside the 3GPP network (as shown in FIG. 3) then in order to perform identity mapping from the source IP address (on which a particular V2X message arrived at the V2X application server) to an IMSI/MS-ISDN that is used for configuring location reporting in the LCS domain, the MDF_3GPP may query an SCEF for the IMSI/MS-ISDN that corresponds to the source IP address. This would be a new service provided by the SCEF, which is not currently standardized. The SCEF may gather the mapping information by querying the P-GW or MME (as described above in this section).

6. Identification of the CA to which Misbehavior Detection Reports are to be Sent There may be multiple CAs utilized within a V2X system, such as to improve throughput, provide for redundancy, or to deploy multiple CAs in different geographic regions. When an MDF detects a misbehaving ITS station, the MDF has to determine which CA a misbehavior indication is to be sent (e.g. task 524 in FIG. 5, 6, or 7).

In some examples, two CA-selecting techniques of selecting a CA from multiple CAs are provided.

With a first CA-selecting technique, the MDF inspects the CA identity that is available within a certificate in a V2X message, and then performs corresponding network layer actions (such as building a fully qualified domain name (FQDN) and performing a Domain Name Server (DNS) lookup) to route a misbehavior indication to the CA determined using the network layer actions.

With a second CA-selecting technique, the MDF receives a misbehavior verification request including one or more pseudonyms identifying a specific ITS station(s) from a requesting CA and sends responsive misbehavior indications corresponding to the specific ITS station(s) to the requesting CA.

First CA-Selecting Technique of Identifying a CA from Multiple CAs

The V2X application server looks at the certificate in a V2X message and determines the identity of the CA that signed the certificate. The CA identity information is passed to the MDF_3GPP either as metadata along with the relevant parts of the V2X message contents, or within the V2X message (in the event that the complete V2X message is sent to the MDF_3GPP). The MDF_3GPP then optionally forwards this information about the relevant CA along with the Misbehavior Verification Response (task 522 in FIG. 5, 6, or 7) to the SCEF (in the event that an SCEF is used). The SCEF then uses the identity of the relevant CA to pass on the message to the CA.

The identity of the CA may, for example, be identified using an FQDN. The SCEF may use the FQDN to either (1) perform a DNS look up to obtain the IP address of the server (e.g., MDF_CA) that receives misbehavior indications, where the FQDN format of such a server may be specified in standards to take a certain form, e.g., misbehaviour-reporting@CAoperator.com; or (2) use the FQDN to identify a particular IP Security (IPsec) tunnel, for example, that is terminated on the SCEF, the other end of which is connected to the misbehavior reporting server (MDF_CA) of the CA.

Second CA-Selecting Technique of Identifying a CA from Multiple CAs

Where the CA indicates that the CA wishes the 3GPP network to perform misbehavior detection on a specific set of pseudonyms/V2X application layer identities, then the 3GPP network can perform the following:

(1) Makes a record (in mapping information) of which CA is associated with which pseudonyms/V2X application layer identities.
(2) Performs misbehavior detection.
(3) Selects the appropriate CA to which the 3GPP network should send misbehavior indications, using the CA to identity mapping information that it stored in task (1) above.

Figure 8:
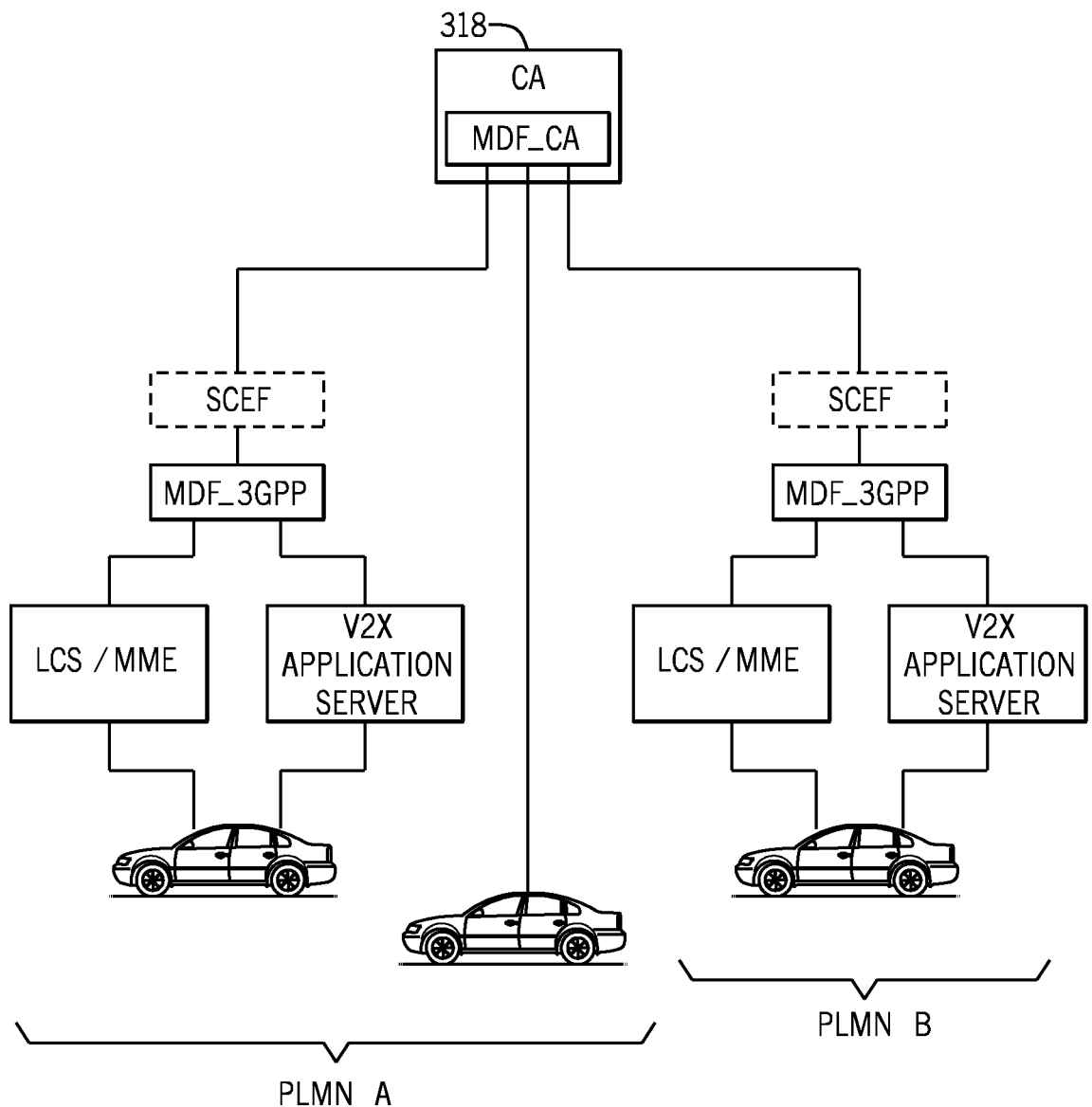
FIG. 8 is a block diagram of an example arrangement including multiple networks, according to further implementations.

7. Identification to which PLMN a CA should Send a Misbehavior Reporting Configuration Message A single CA may be serving more than one PLMN. For example, FIG. 8 shows a CA 318 that serves PLMN A and PLMN B.

In some examples of the present disclosure, the CA 318 is able to determine which PLMN the CA 318 should send a Misbehavior Reporting Configuration message. The following describes two PLMN-selecting techniques.

First PLMN-Selecting Technique

With a first PLMN-selecting technique, it is assumed that the CA 318 only sends a Misbehavior Reporting Configuration message to the 3GPP network if the CA 318 has first received a misbehavior indication directly from another ITS station (a detecting ITS station). Therefore, with the first PLMN-selecting technique, the misbehavior indication from the other ITS station also includes information, such as a serving PLMN, a country code, which can be used to identify or at least narrow down the relevant set of target PLMNs to which the Misbehavior Reporting Configuration message can be sent.

When the detecting ITS station provides its misbehavior indication on a suspicious ITS station to an MDF_CA, the detecting ITS station also provides other information that enables the CA to narrow down the set of PLMNs to which the CA may wish to later issue a request for misbehavior detection. For example, the detecting ITS station can include the identity of the serving PLMN that is supporting a V2X service. As another example, the detecting ITS station may include the country in which the detecting ITS station is located (which would likely narrow down the number of PLMNs).

The MDF_CA can then issue requests for misbehavior detection reporting on the suspicious ITS station to:

(1) The serving PLMN identity of the detecting ITS station that provided the misbehavior indication. This may be appropriate where only a single PLMN provides V2X service in a country.
(2) Multiple PLMNs in the same country as the detecting ITS station's serving PLMN (i.e., with the same Mobile Country Code (MCC) as that of the serving PLMN), where those PLMNs provide V2X service. Usage of this option may be appropriate where more than one PLMN provides V2X service in a country and where V2X messages are shared (e.g. re-broadcasted) across multiple PLMNs. In this case, the MDF_CA may not know which of the multiple V2X service supporting PLMNs in the country is the serving PLMN of the suspicious ITS station), noting that only the serving PLMN is capable of tracking the suspicious ITS station for the purpose of detecting misbehavior.

Second PLMN-Selecting Technique

With a second PLMN-selecting technique, once an ITS station has attached to a 3GPP network and before the ITS station is authorized to receive V2X service, the UE provides an HPLMN Notification V2X message that includes the ITS station's V2X certificate and may optionally include the device's HPLMN. Then using the technique described in the subsection "Mapping identities" of Section 5 above, the 3GPP network determines the IMSI and hence the HPLMN associated with the HPLMN Notification message. The 3GPP network appends an HPLMN Identity (PLMN ID) to the HPLMN Notification message, and forwards the HPLMN Notification message to the CA. The CA then ensures that the certificate is valid and associates the 3GPP network provided HPLMN Identity with the ITS station identity and then responds to the 3GPP network node (e.g., SCEF or MDF_3GPP) that this procedure has completed successfully. The 3GPP network then notifies the UE that use of V2X services is permitted. The CA can then send Misbehavior Reporting Configuration messages (e.g., for a suspected misbehaving ITS station) to the HPLMN of that ITS station, and the HPLMN may optionally forward the Misbehavior Reporting Configuration message to the visited PLMN in the event that the ITS station is roaming in the visited PLMN.

Both a home MDF_3GPP (hMDF_3GPP) and a visited MDF_3GPP (vMDF_3GPP) are assumed.

The CA (MDF_CA) contacts the hMDF_3GPP to request misbehavior detection on a particular identity (e.g., pseudonym_CA), and in response, the hMDF_3GPP passes the request to the vMDF_3GPP that then detects misbehavior as described above. If misbehavior is detected, the vMDF_3GPP passes a misbehavior indication back to the hMDF_3GPP, which then passes the misbehavior indication back to the CA (more particularly MDF_CA).

8. Formats of 3GPP Misbehavior Indication

A number of possible formats of misbehavior indications (e.g., misbehavior detection reports) can be provided. Options described include providing one or more of: an identifier of the suspected misbehavior, and raw data, with corresponding timestamps (or timestamp differences), that led to this assessment of probable misbehavior, where the raw data is derived from the V2X message and through the independent measurements of corresponding parameters made by the 3GPP network. An identity of a misbehaving ITS station can also be included in a misbehavior indication.

Tagged V2X Information

After assessing a mismatch between a V2X uplink message and 3GPP location information (possibly deducting the acceleration from the position and/or speed), the MDF can replicate the V2X information in a message that is sent to the CA. Such information can be for example "Emergency electronic brake lights." Each parameter can be tagged with an indication as to whether the parameter seems trustable or not (useful in the case where more than one information element is added in a message). Alternatively, since the intention of the message is to indicate information that cannot be trusted, any information sent from MDF to CA can be defined as un-trustable by default.

V2X Information with Additional Information

Table 2 below provides an example of additional information that can be provided with V2X information.

TABLE 2

| V2X information | 3GPP information | Additional information | Additional information |
|---|---|---|---|
| UE location | UE location | Time difference: the difference between the times that the 3GPP system determined device location and the time at which the location as reported in the V2X message was measured. | "Location is suspicious because the difference in locations is significant given the difference in times when the locations were determined" or "Location is suspicious" |

Although the two "Additional information" columns of Table 2 above explain possible contents of the V2X information, it is noted that in some examples, enumerated values or binary flags can be included to provide the indication of the possible contents noted in Table 2, as well as in the other tables set forth below.

Several information category options can be provided. In a first option, the MDF provides the UE location assessed by V2X. This implicitly indicates to the CA that this information seems implausible because a different 3GPP location has been assessed (e.g., within a time period that is considered too short for this to be plausible given the observed location difference or parameters). In another option, the MDF provides UE locations assessed by V2X and 3GPP (two locations). In a further option, the MDF can provide the time difference between the two location assessments. It can optionally add the 3GPP location only (second column) to the message. Optionally a specific parameter (last column above) reflecting that the location is suspicious can be added.

An approach similar to the above can be provided for the UE speed:

TABLE 3a

| V2X information | 3GPP information | Additional information | Additional information |
|---|---|---|---|
| UE speed and/or "Slow vehicle" and/or "Stationary vehicle" | UE speed | The difference between the times at which the 3GPP system determined device speed and the time at which the V2X information (first column) was measured/assessed. | "Speed is suspicious because the difference in speed is large compared to the time difference when speed measurements were taken," or "Speed is suspicious" |

TABLE 3b

| V2X information | 3GPP information | Additional information | Additional information |
|---|---|---|---|
| UE direction | UE direction | The difference between the times at which the 3GPP system determined device direction and the time at which the V2X system determined device direction. | "Direction is suspicious because the difference in direction is large compared to the time difference when V2x/3GPP measurements were taken," or "Direction is suspicious" |

The MDF can spot that there is mismatch between speed claimed from V2X and 3GPP. As a result, the V2X information assessed as un-trustable can also be "Slow vehicle" and/or "Stationary vehicle.". The MDF can spot that there is mismatch between direction of travel claimed from V2X and 3GPP. This could be triggered after the MDF receiving V2X information as "wrong way driving".

An indication of emergency electronic brake lights can also be provided, as set forth in Table 4 below.

TABLE 4

| V2X information | 3GPP information | Additional information |
|---|---|---|
| "Emergency electronic brake lights" | "UE is not decelerating" and/or acceleration/deceleration value | Suspicious information |

For Table 4, the MDF has spotted, identified or determined that the car is indicating V2X braking, while the deceleration (e.g., estimated by 3GPP location or speed) does not reflect a braking (because the acceleration is above a threshold, or the deceleration is below a threshold). In one option, just a parameter reflecting the first column above is enough, because the MDF has assessed that this information was not trustable. In another option, column 2 of Table 4 can be used instead or in addition, providing optionally additional information. A parameter in column 3, "Suspicious information" can optionally be added (if the first or second column does not reflect suspicious information by default).

An indication of a traffic jam can also be provided, as indicated by Table 5 below.

TABLE 5

| V2X information | 3GPP information | Additional information |
|---|---|---|
| "Traffic Jam" | "UE drives at normal speed" and/or UE speed value | Suspicious information |

In this example, the MDF can use one or more criteria to assess from the 3GPP location or 3GPP speed that the ITS station is driving at a normal' speed, e.g., the speed is between a low threshold and a high speed threshold. In a first solution, the ITS station that sent the V2X "Traffic Jam" indication is the same ITS station that is driving at normal speed (therefore this is the ITS sending suspicious information).

In another solution, the MDF has assessed that a majority of ITS stations in a given area/direction of travel are travelling at normal speed, when a target ITS station sent the V2X "Traffic Jam" indication. The MDF can assess by itself that the "Traffic Jam" indication is not trustable and indicate this to the CA. Optionally, the MDF can add the number of ITS station in the area/direction of travel that have been assessed with conflicting speeds (normal speeds not consistent with a traffic Jam), as set forth in Table 6 below.

TABLE 6

| V2X information | Additional information | Additional information |
|---|---|---|
| "Traffic Jam" | Number of UEs that drive at normal speed in this area/direction of travel and/or number of UEs with their respective speeds and/or number of UEs with their average/standard deviation speed | V2X "Traffic Jam" appears as suspicious information |

An indication of "Pre-crash warning" can also be provided, as indicated below.

In this example, the MDF may have assessed that no crash happened, even though a target ITS station sent a V2X "Pre-crash warning." This can be detected because the target ITS station did not decelerate, or an ITS station following the target ITS station did not decelerate. The MDF assessment may be performed over a longer time period than other examples above, to detect if a target ITS station keeps sending incorrect crash information.

TABLE 7

| V2X information | Additional information | Additional information |
|---|---|---|
| "Pre-crash warning" | "This UE did not decelerate" and/or number of other UEs in this area/direction of travel that did not decelerate | V2X "Pre-crash warning" appears as suspicious information |

One or more of the three information elements (columns above) in Table 6 can be provided. As with other examples above, information from the last column may be implicit given the indication(s) from the other column(s) of Table 6, and is hence optional.

9. Example System

Figure 9:
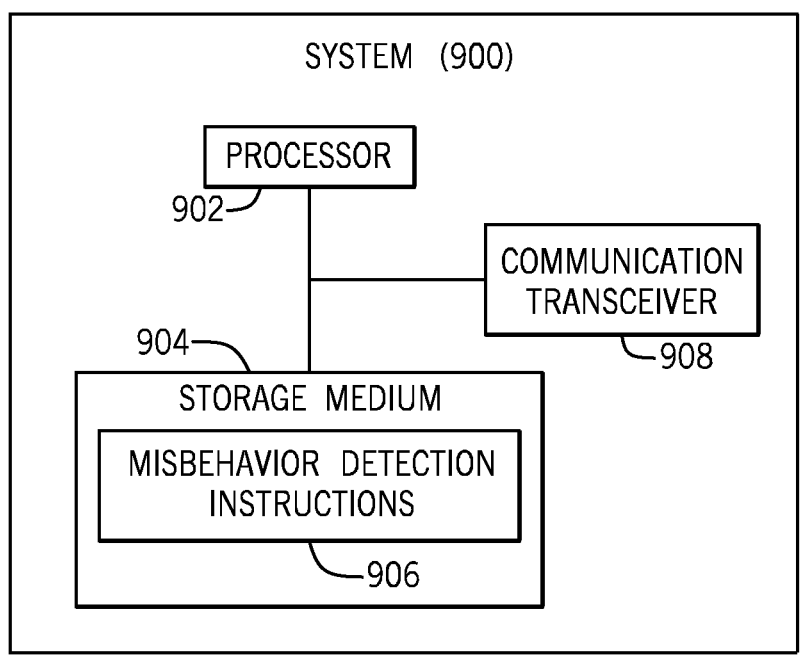
FIG. 9 is a block diagram of an example system according to some implementations.

FIG. 9 is a block diagram of a system 900 according to some examples (which can be an MDF, a CA, an ITS station, a V2X application server, and so forth). The system 900 includes a processor 902 (or multiple processors). A processor can include a microprocessor, a core of a multi-core microprocessor, a microcontroller, a programmable integrated circuit, a programmable gate array, or another hardware processing circuit.

The system 900 further includes a non-transitory machine-readable or computer-readable storage medium 904 storing machine-readable instructions, such as misbehavior detection instructions 906 that are executable on the processor 902 to perform various tasks as discussed in the present disclosure. Instructions executable on a processor can refer to the instructions executing on one processor or on multiple processors.

The system 900 includes a communication transceiver 908 to communicate over a network.

The storage medium 904 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a system from a vehicle-to-everything (V2X) application server, first information comprising location information of an intelligent transport system (ITS) station; and
   detecting, by the system based on the first information comprising the location information of the ITS station and based on second information provided by a cellular network, misbehavior of the ITS station, the second information relating to the ITS station and including location information acquired by the cellular network.

2. The method of claim 1, wherein the detecting comprises comparing the first information from the V2X application server and the second information acquired by the cellular network.

3. The method of claim 1, further comprising:
responsive to determining the misbehavior of the ITS station, causing revocation of a certificate of the ITS station.

4. The method of claim 1, wherein the location information acquired by the cellular network comprises location information acquired by a Third Generation Partnership Project (3 GPP) network.

5. The method of claim 1, wherein the location information acquired by the cellular network comprises location information acquired by a Location Services (LCS) process or location information acquired by a Mobility Management Entity (MME).

6. The method of claim 1, wherein the location information included in the second information comprises one or more of a Cell Identity, a location, a speed, a velocity, and a direction corresponding to the ITS station.

7. The method of claim 1, wherein the first information further relates to one or more of a traffic condition around the ITS station, an operational condition of the ITS station, and a warning relating to the ITS station.

8. The method of claim 1, wherein the first V2X application server provides V2X services to ITS stations.

9. The method of claim 8, further comprising:
sending, by the system to the V2X application server, an information request that identifies the ITS station,
wherein the receiving the first information is responsive to the information request.

10. The method of claim 1, further comprising:
receiving, by the system from a certificate authority, a misbehavior request; and
responsive to the detecting of the misbehavior of the ITS station, sending, by the system to the certificate authority, an indication of the misbehavior of the ITS station, the indication of the misbehavior responsive to the misbehavior request, and the sending of the indication of the misbehavior of the ITS station to cause a revocation by the certificate authority of a certificate of the ITS station.

11. The method of claim 1, further comprising:
sending, by the system, a location service request to the cellular network to request information of the ITS station,
wherein the second information provided by the cellular network is responsive to the location service request.

12. The method of claim 11, wherein the first information comprises a first identity associated with the ITS station, the method further comprising:
mapping, by the system, the first identity to a different second identity used in the location service request.

13. The method of claim 12, wherein the second identity comprises one of:
an identifier selected from among an Internet Protocol (IP) address, a Mobile Subscriber Integrated Services Digital Network Number (MSIDSN), International Mobile Subscriber Identity (IMSI), and a Session Initiation Protocol Uniform Resource identifier (SIP-URI), or
a location service pseudonym useable to derive an identifier.

14. The method of claim 12, wherein the first identity comprises a certificate pseudonym.

15. The method of claim 1, wherein the second information provided by the cellular network comprises a cell global identity.

16. The method of claim 1, further comprising:
responsive to the detecting of the misbehavior of the ITS station, sending, by the system to a certificate authority, an indication of the misbehavior of the ITS station, wherein the certificate authority is identified, from among a plurality of certificate authorities, based on one of:
an identifier of the certificate authority derived from a certificate in a message, or
a recorded identifier of the certificate authority as recorded by the system in response to a request from the certificate authority.

17. A misbehavior detection device, comprising:
at least one processor configured to:
receive, at the misbehavior detection device from a vehicle-to-everything (V2X) application server, first information comprising location information of an intelligent transport system (ITS) station; and
detect, based on the first information comprising the location information of the ITS station and based on second information provided by a cellular network, misbehavior of the ITS station, the second information relating to the ITS station and including location information acquired by the cellular network.

18. The method of claim 10, further comprising:
sending, by the system to the V2X application server, a request for V2X information that includes an identifier of the ITS station, wherein the second information is included in the V2X information from the V2X application server.

19. The method of claim 18, wherein the request for V2X information is sent by the system to the V2X application server in response to the misbehavior request from the certificate authority.

20. The misbehavior detection device of claim 17, wherein the at least one processor is configured to:
receive, at the misbehavior detection device from a certificate authority, a misbehavior request that is responsive to a misbehavior indication from another ITS station that has detected suspected misbehavior of the ITS station; and
responsive to the detecting of the misbehavior of the ITS station by the misbehavior detection device, send, to the certificate authority, an indication of the misbehavior of the ITS station, the indication of the misbehavior responsive to the misbehavior request.

21. The misbehavior detection device of claim 20, wherein the at least one processor is configured to:
send, from the misbehavior detection device to the V2X application server, a request for V2X information that includes an identifier of the ITS station, wherein the second information is included in the V2X information from the V2X application server, and wherein the request for the V2X information is sent from the misbehavior detection device to the V2X application server in response to the misbehavior request from the certificate authority.

22. The misbehavior detection device of claim 17, wherein the V2X application server is to provide V2X services to ITS stations.

23. A non-transitory machine-readable storage medium comprising instructions that upon execution cause a device to:
receive, at the device from a vehicle-to-everything (V2X) application server, first information comprising location information of an intelligent transport system (ITS) station; and detect, based on the first information comprising the location information of the ITS station and based on second information provided by a cellular network, misbehavior of the ITS station, the second information relating to the ITS station and including location information acquired by the cellular network.

* * * * *

UNITED STATES PATENT AND TRADEMARK OFFICE
CERTIFICATE OF CORRECTION

| | | |
|---|---|---|
| PATENT NO. | : 11,146,408 B2 | Page 1 of 1 |
| APPLICATION NO. | : 16/613914 | |
| DATED | : October 12, 2021 | |
| INVENTOR(S) | : Claude Jean-Frederic Arzelier, Stephen John Barrett and Eswar Vutukuri | |

It is certified that error appears in the above-identified patent and that said Letters Patent is hereby corrected as shown below:

In the Claims

Column 23:
Line 23, "the first V2X" should be --the V2X--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*